(12) United States Patent
Weber et al.

(10) Patent No.: US 10,502,355 B2
(45) Date of Patent: Dec. 10, 2019

(54) PIPE TAPPING SADDLE

(71) Applicant: Georg Fischer Wavin AG, Schaffhausen (CH)

(72) Inventors: Jonas Weber, Klettgau (DE); Jonas Huessy, Neunkirch (CH); Edwin Habluetzel, Schaffhausen (CH)

(73) Assignee: GEORG FISCHER WAVIN AG, Schaffhausen (CH)

( * ) Notice: Subject to any disclaimer, the term of this patent is extended or adjusted under 35 U.S.C. 154(b) by 0 days.

(21) Appl. No.: 15/904,623

(22) Filed: Feb. 26, 2018

(65) Prior Publication Data

US 2018/0245724 A1    Aug. 30, 2018

(30) Foreign Application Priority Data

Feb. 28, 2017    (EP) .................................. 17158276

(51) Int. Cl.
| | |
|---|---|
| *F16L 47/34* | (2006.01) |
| *F16L 41/06* | (2006.01) |
| *F16L 47/30* | (2006.01) |
| *B29C 65/00* | (2006.01) |
| *F16L 47/02* | (2006.01) |

(52) U.S. Cl.
CPC ............. *F16L 47/345* (2013.01); *F16L 41/06* (2013.01); *F16L 47/30* (2013.01); *B29C 66/52241* (2013.01); *F16L 47/02* (2013.01)

(58) Field of Classification Search
CPC ......... F16L 47/345; F16L 47/02; F16L 47/30; F16L 41/06
USPC .................................................... 137/317, 318
See application file for complete search history.

(56) References Cited

U.S. PATENT DOCUMENTS

| | | | |
|---|---|---|---|
| 3,692,044 A | 9/1972 | Wise | |
| 4,411,459 A * | 10/1983 | Ver Nooy | F16L 41/06 137/15.12 |
| 6,260,573 B1 | 7/2001 | Lehmann et al. | |
| 7,246,634 B2 * | 7/2007 | Maier et al. | F16L 41/06 137/318 |

FOREIGN PATENT DOCUMENTS

| | | |
|---|---|---|
| DE | 19603254 A1 | 8/1996 |
| DE | 19932401 A | 1/2001 |

* cited by examiner

*Primary Examiner* — Kevin L Lee
(74) *Attorney, Agent, or Firm* — Leydig, Voit & Mayer, Ltd.

(57) ABSTRACT

A pipe tapping saddle for a main pipe having a center axis and conveying a medium. The pipe tapping saddle includes a saddle piece; a branch pipe having a center axis, a drill socket having a center axis, and a drill with a thread being arranged displaceably in the drill socket for tapping the main pipe. The pipe tapping saddle is arranged on the main pipe. A center axis of the branch pipe runs horizontally and is arranged below an upper crown point of the main pipe.

11 Claims, 2 Drawing Sheets

PIPE TAPPING SADDLE

CROSS REFERENCE TO RELATED APPLICATIONS

This application claims benefit to European Patent Application No. EP 17 158 276.0, filed Feb. 28, 2017, which is incorporated by reference herein.

FIELD

The invention relates to a pipe tapping saddle for a main pipe conveying a medium, preferably gas or water, which is preferably made from plastic and has a centre axis, wherein the pipe tapping saddle is arranged on a main pipe, containing a saddle piece, a branch pipe, the branch pipe having a centre axis, a drill socket, a drill, preferably with a thread, being arranged displaceably in the drill socket for tapping the main pipe and the drill socket having a centre axis.

BACKGROUND

Pipe tapping saddles are known from the prior art and serve to connect a branch line to a main pipe. Such tapping saddles are usually placed on the highest point of the outer circumference of the already laid main pipe, as a result of which the drilling is carried out into the main pipe vertically from above. Such a tapping T-piece is disclosed in DE 199 32 401. A disadvantage of such tapping T-pieces is the high loss of pressure owing to the high flow resistance which is generated by the multiple deviations of the medium which is first deviated by 90° via the tapping socket and then again by 90° in the branch socket.

There is furthermore a great disadvantage in its installed height. Because this tapping T-piece sticks up and because it protrudes above the main pipe, there is a high risk of the tapping T-piece becoming damaged during installation. In addition, because it sticks up, this form of tapping T-piece is liable to freeze up or the medium in the pipe tapping saddle is liable to freeze up.

U.S. Pat. No. 3,692,044 likewise discloses a tapping saddle where, despite the fact that it is capable of being mounted with a reduced installed height, multiple deviations of the medium are required through the channel between the tapping socket and the branch socket. The throughflow is severely restricted by the at least twofold deviation by 90°.

DE 196 03 254 A1 discloses a further embodiment of a tapping saddle with a V-shaped arrangement. Explicit reference is made here to the small installed height in the case of a proposed mounting angle of 90° to the crown position. However, the design differs explicitly from the design proposed here. In DE 196 03 254 A1, the drill and branch sockets are arranged in a common axial plane that lies through the pipeline. In addition, the tapping socket is angled, which can lead to problems during the tapping. A further point that should be mentioned is the point of intersection of the axes which is situated in the region of the saddle and not, as proposed here, in the region of the inside of the pipe. This has the consequence that the throughflow is reduced more strongly than with the proposed alternative embodiment.

SUMMARY

In an embodiment, the present invention provides a pipe tapping saddle for a main pipe having a center axis and conveying a medium. The pipe tapping saddle includes a saddle piece; a branch pipe having a center axis, a drill socket having a center axis, and a drill with a thread being arranged displaceably in the drill socket for tapping the main pipe. The pipe tapping saddle is arranged on the main pipe. A center axis of the branch pipe runs horizontally and is arranged below an upper crown point of the main pipe.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
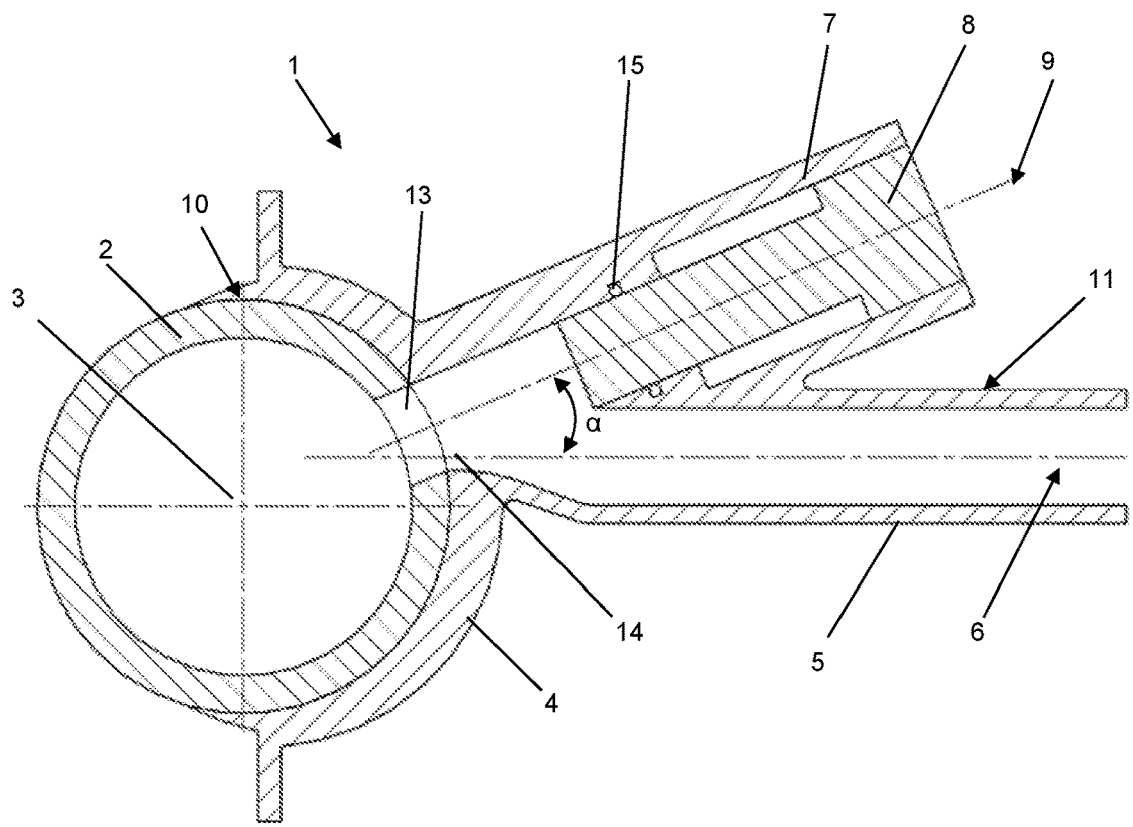
FIG. 1 shows a view in section of a pipe tapping saddle according to an embodiment of the invention fastened to the main pipe.

Embodiments of the invention provide pipe tapping saddles in which the installed height is reduced and the branch pipe is not arranged above the main pipe, and the flow resistance is reduced, which entails a reduction in the loss of pressure. Embodiments of the invention provide pipe tapping saddles in which the centre axis of the branch pipe runs horizontally and is arranged below the upper crown point of the main pipe.

The pipe tapping saddle is preferably made from plastic. It is arranged on a main pipe in order to provide a bore therein to enable the connection of a pipeline via the branch pipe arranged on the pipe tapping saddle. The pipe tapping saddle contains a saddle piece, the saddle piece surrounding the main pipe locally. The saddle piece preferably contains a heating coil which, by virtue of its heat, enables the saddle piece to be connected to the main pipe by being fused. The pipe tapping saddle contains a branch pipe which enables the connection to a branching pipeline. The drill socket arranged on the pipe tapping saddle has a drill arranged therein which can be displaced along the centre axis of the drill socket in order to provide the bore in the main pipe.

The pipe tapping saddle is preferably designed as a single piece with a saddle piece, drill socket and branch pipe. The centre axis of the branch pipe or the branch pipe runs horizontally, the centre axis of the branch pipe being arranged below the upper crown point of the main pipe. The branch pipe is thus connected directly to the main pipe outer circumference without any deviation. This has many advantages compared with the pipe tapping saddles which are known from the prior art. Because the branch pipe or its centre line is arranged below the crown point of the main pipe, the pipe tapping saddle has a smaller installed height and does not protrude above the main pipe, which reduces the risk of freezing up in winter and also the risk of damage during installation work. It is furthermore possible to dispense with multiple deviation of the medium because the branch pipe is connected directly to the main pipe, as a result of which the flow resistance is reduced and hence the loss of pressure is lowered too.

An advantageous design has shown itself to be one where the upper crown line of the branch pipe is arranged below the upper crown point of the main pipe. The upper crown point of the main pipe is understood to be the uppermost point on the outer diameter of the pipe at which a tangent plotted thereon would extend horizontally. The upper crown line of the horizontally extending branch pipe extends along the outer diameter of the branch pipe at the highest point and also through the crown point of the branch pipe. This arrangement ensures that the branch pipe always extends below the highest point of the outer diameter of the main pipe.

A preferred arrangement of the drill socket consists in the centre axis of the drill socket being oriented perpendicularly to the centre axis of the main pipe and the centre axis of the drill socket intersecting the centre axis of the main pipe at right angles. Optimal tapping at right angles to the main pipe is enabled by virtue of the perpendicular arrangement of the drill socket on the main pipe.

The drill socket is preferably oriented so that it is inclined relative to the tapping socket, in other words the centre axis of the drill socket extends at an angle $\alpha < 90°$ to the centre line of the branch pipe, which is oriented horizontally.

The centre axes of the drill socket and the branch socket preferably extend within a plane, wherein the plane is oriented at right angles to the centre axis of the main pipe, and the centre axis of the main pipe extends perpendicularly to or through the plane.

It is advantageous if the centre axis of the branch pipe extends through the borehole in the main pipe, which was generated by means of the drill which is arranged in the pipe tapping saddle. By virtue of the arrangement of the drill socket and the borehole generated correspondingly therewith and the horizontally arranged branch socket, a flow resistance which is as low as possible is generated, which in turn causes only a small loss of pressure.

The saddle piece preferably has a drilling opening which corresponds to the drilling diameter of the drill or is slightly larger than it. The centre axis of the branch pipe extends through the drilling opening, which likewise ensures an optimal flow profile.

The transition from the drilling opening in the saddle piece to the internal diameter of the branch pipe is designed to be rounded in order to have a positive influence on the flow profile.

The centre axes of the drill socket and the branch pipe preferably extend within a plane, wherein they intersect in the region of the internal diameter of the main pipe.

It is advantageous if the sealing during the tapping is ensured in the drill socket by means of a seal, wherein the seal is arranged on the internal diameter of the drill socket, and the seal is preferably designed as an O-ring or profile seal. This seal ensures that none of the medium can escape during the tapping, and also that none of the medium leaks after the pipe tapping saddle has been mounted.

A further conceivable embodiment of the pipe tapping saddle according to the invention is a seal in the drill socket which is arranged as a plastic diaphragm in the region of the seal or in the lowest possible region of the drill socket, which seal closes off the drill socket and has to be drilled through first. The drilled-through plastic diaphragm then serves as a seal on the drill or between the drill and the drill socket so that none of the medium can come out through the drill socket during or after the tapping.

The drawing shown in FIG. 1 shows the pipe tapping saddle 1 according to an embodiment of the invention which is fastened or welded to the main pipe 2. The main pipe 2 serves to convey the medium and is preferably produced from plastic. The main pipe 2 has a centre axis 3. The pipe tapping saddle 1 is preferably fastened or welded to the main pipe 2 via the saddle piece 4 by means of a heating coil (not shown). The pipe tapping saddle 1 contains a branch pipe 5 and a drill socket 7. The pipe tapping saddle 1 is preferably designed as a single piece with a saddle piece 4, branch pipe 5 and drill socket 7. A drill 8, which is can be displaced along the centre axis 9 of the drill socket 7 in order to provide the corresponding bore or borehole 13 in the main pipe, is arranged in the drill socket 7. The branch pipe 5 and its centre axis 6 is oriented horizontally and the centre axis 6 of the branch pipe 5 is arranged below the crown point 10 of the main pipe 2. The branch pipe 5 serves to connect a line branching off from the main pipe. The crown point 10 is situated at the highest point of the external diameter of the main pipe 2 and a tangent through this point would extend horizontally. By virtue of this arrangement of the branch pipe 5 and the pipe tapping saddle 1, it is ensured that the branch pipe 5 enters the main pipe 2 directly and there is no deviation, as is known from the prior art. This reduces the flow resistance and hence the loss of pressure too. By lowering the loss of pressure owing to the arrangement of the pipe tapping saddle 1 and its drill socket 7 and branch pipe 5, a smaller drilling diameter and drill 8 can be used, as a result of which the tapping forces for drilling the borehole 13 in the main pipe 2 can be reduced too.

Figure 2:
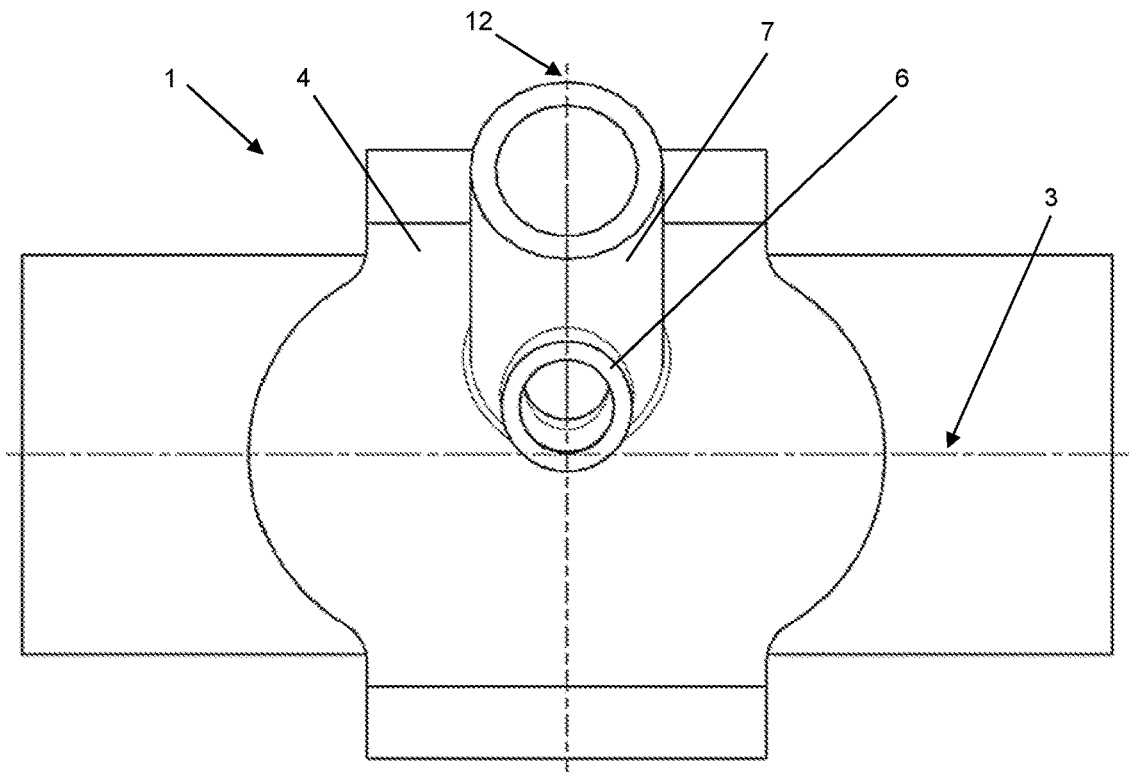
FIG. 2 shows a plan view of a pipe tapping saddle according to an embodiment of the invention fastened to the main pipe.

In an advantageous embodiment of the pipe tapping saddle 1 according to an embodiment of the invention, the upper crown line 11 of the branch pipe 5, which extends along the outer circumference of the branch pipe 5 at the highest point and passes through the crown point 10 of the main pipe 2, is arranged below the upper crown point 10 of the main pipe 2. By virtue of this arrangement, it is ensured that the branch pipe 5 does not stick out above the main pipe 2, whereby undesired damage during the installation phase can be avoided. The centre axis 9 of the drill socket 7 extends perpendicularly to the centre axis 3 of the main pipe 2, which enables optimum tapping of the main pipe 2 because the drill 8 engages with the outer surface of the main pipe 2 at right angles. The drill socket 7 and the centre axis 9 of the drill socket 7 is inclined by an angle $\alpha < 90°$ to the centre axis 3 of the main pipe 2, the centre axes 6, 9 being arranged on the same plane 12, which can be seen clearly in FIG. 2. The plane 12 extends at right angles to the centre axis 3 of the main pipe 2 and the centre axis 3 of the main pipe 2 extends perpendicularly through the plane 12.

Figure 3:
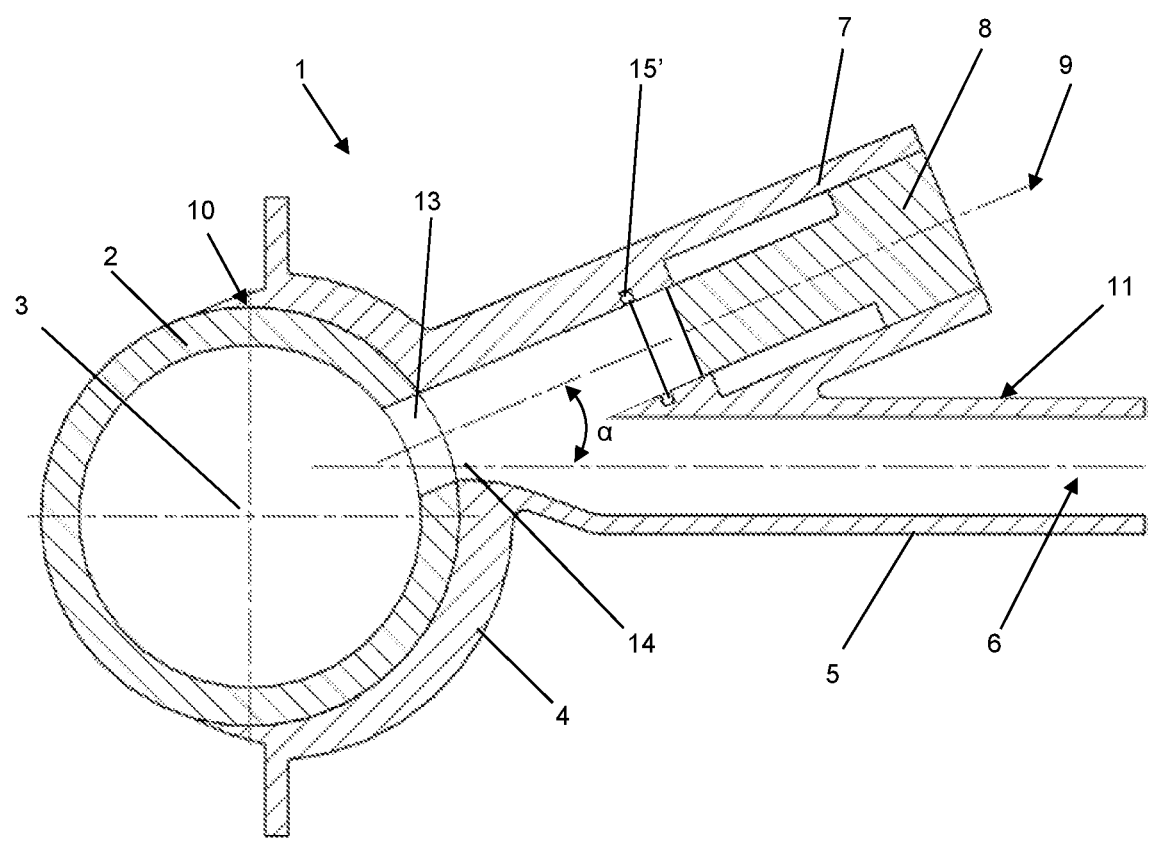
FIG. 3 shows a view in section of a pipe tapping saddle according to an embodiment of the invention fastened to the main pipe.

It can be clearly seen in FIG. 1 that the centre axis 6 of the branch pipe 5, which extends horizontally, extends through the borehole 13 which is drilled with the drill 8 which can be displaced in the drill socket 7. A drilling opening 14, which corresponds to the diameter of the drill 8 or is designed to be slightly larger, is provided in the saddle piece 4 and in the pipe tapping saddle 1, and of course the centre axis 6 of the branch pipe 5 also passes through the drilling opening 14. As already mentioned, the centre axes 6, 9 of the drill socket 7 and the branch pipe 5 lie on the plane 12 and intersect in the region of the internal diameter of the main pipe 2, as can be clearly seen in FIG. 1. In order to ensure the sealing of the pipe tapping saddle 1, a seal 15 is preferably arranged in the drill socket 7 at the internal diameter. The seal 15 ensures that none of the medium leaks during the tapping via the drill socket 7 or also after the tapping. Alternatively, as shown in FIG. 3, a plastic diaphragm 15' can also be provided in the drill socket 7, which then has to be drilled through by means of a drill 8 and then forms a seal for sealing the pipe tapping saddle 1, and the plastic diaphragm is preferably arranged in the region of the seal or closer to the main pipe and closes off the drill socket 7 until it is drilled through.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 pipe tapping saddle
2 main pipe
3 main pipe centre axis
4 saddle piece
5 branch pipe
6 branch piece centre axis
7 drill socket
8 drill
9 drill socket centre axis
10 main pipe upper crown point
11 branch pipe crown line
12 plane
13 borehole
14 drilling opening
15 seal
α angle of drill socket centre axis/branch pipe centre axis

What is claimed is:

1. A pipe tapping saddle for a main pipe having a center axis and conveying a medium, the pipe tapping saddle comprising:
   a saddle piece;
   a branch pipe having a center axis,
   a drill socket having a center axis,
   a drill with a thread being arranged displaceably in the drill socket for tapping into the main pipe,
   wherein the pipe tapping saddle is arranged on the main pipe,
   wherein the center axis of the branch pipe runs horizontally and is arranged below an upper crown point of the main pipe,
   wherein the center axis of the drill socket is oriented perpendicularly to the center axis of the main pipe, and
   wherein the center axis of the drill socket intersects the center axis of the main pipe at a right angle.

2. The pipe tapping saddle according to claim 1, wherein an upper crown line of the branch pipe is arranged below the upper crown point of the main pipe.

3. The pipe tapping saddle according to claim 1, wherein the center axis of the drill socket is arranged at an angle α<90° to the center axis of the branch pipe.

4. The pipe tapping saddle according to claim 1, wherein the center axes of the drill socket and the branch pipe are arranged on a plane, wherein the plane is arranged at a right angle to the center axis of the main pipe.

5. The pipe tapping saddle according to claim 1, wherein the center axis of the branch pipe extends through a borehole drilled through the main pipe by the drill.

6. The tapping saddle according to claim 1, wherein the saddle piece has a drill opening, wherein the center axis of the branch pipe extends through the drilling opening.

7. The pipe tapping saddle according to claim 1, wherein the center axes of the drill socket and the branch pipe extend within a plane and intersect in a region of an internal diameter of the main pipe.

8. The pipe tapping saddle according to claim 1, wherein sealing during the tapping is ensured in the drill socket by means of a seal, and wherein the seal is arranged on an internal diameter of the drill socket.

9. The pipe tapping saddle according to claim 8, wherein the seal is designed as a plastic diaphragm which closes off the drill socket before the plastic diaphragm is drilled through with the drill and after being drilled through, the plastic diaphragm provides a seal between the drill socket and the drill.

10. The pipe tapping saddle according to claim 8, wherein the seal is an O-ring or a profile seal.

11. The pipe tapping saddle according to claim 6, wherein the drill opening corresponds to a drilling diameter of the drill.

* * * * *